L. C. FROHRIEB.
APPARATUS FOR SEPARATING VAPOR FROM GAS AND OTHER FLUIDS.
APPLICATION FILED JULY 19, 1916.

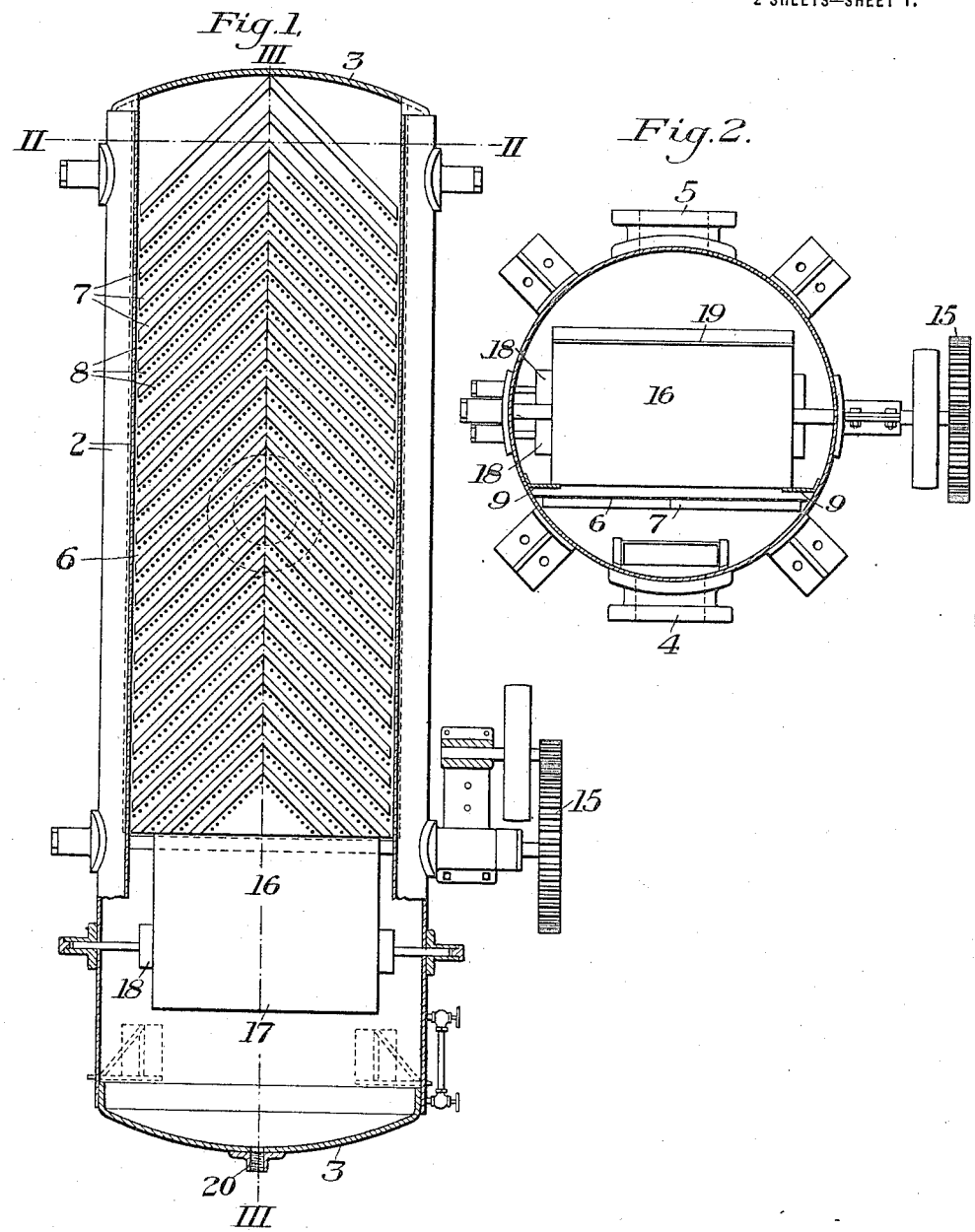

1,222,751.

Patented Apr. 17, 1917.
2 SHEETS—SHEET 2.

WITNESSES

INVENTOR
Louis C. Frohrieb

UNITED STATES PATENT OFFICE.

LOUIS C. FROHRIEB, OF PITTSBURGH, PENNSYLVANIA.

APPARATUS FOR SEPARATING VAPOR FROM GAS AND OTHER FLUIDS.

1,222,751.  Specification of Letters Patent.  Patented Apr. 17, 1917.

Application filed July 19, 1916. Serial No. 110,087.

*To all whom it may concern:*

Be it known that I, LOUIS C. FROHRIEB, a citizen of the United States, residing at Dormont borough, Pittsburgh, Allegheny county, Pennsylvania, have invented a new and useful Apparatus for Separating Vapor from Gas and other Fluids, of which the following is a full, clear, and exact description, reference being had to the accompanying drawings, in which—

Figure 1 is a sectional elevator of one form of apparatus embodying my invention.

Fig. 2 is a section on the line II—II of Fig. 1.

My invention has relation to apparatus for separating vapor from gas, or from other fluids, such as steam or air.

The object of my invention is to provide a simple and effective apparatus of this character which may be constructed, installed, and operated at a relatively low cost.

The nature of my invention will be best understood by reference to the accompanying drawings, in which I have shown a preferred embodiment thereof, and which will now be described, it being premised, however, that various changes may be made in the details of construction and arrangement of the several parts without departing from the spirit and scope of my invention as defined in the appended claims.

In the accompanying drawings, the numeral 2 designates an inclosing casing which may be conveniently in the form of a vertical cylindrical tank having closed heads 3 at its ends. This tank is provided at one side with an approximately central inlet connection 4 and at the opposite side with an outlet connection 5. These connections are adapted for attachment in a pipe line, not shown.

Figure 3:
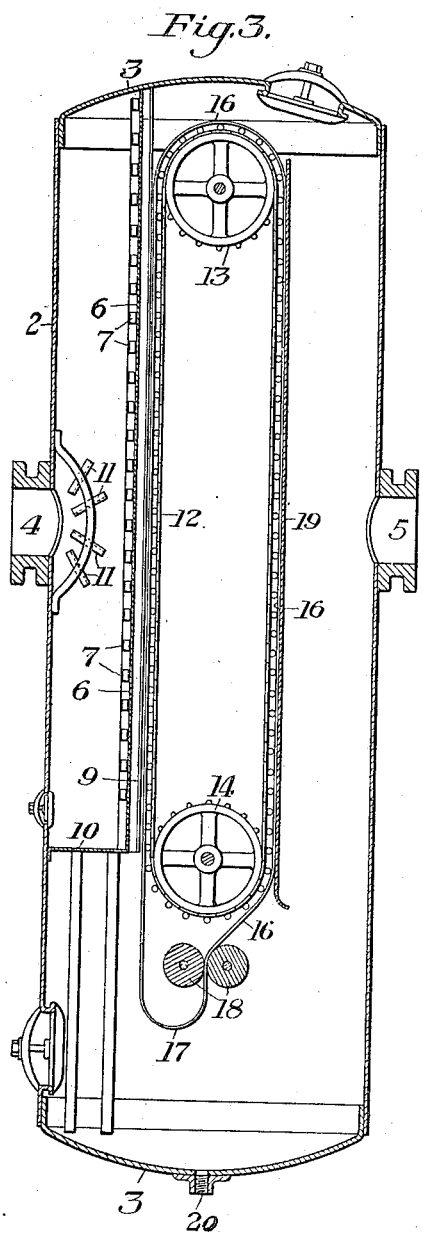
Fig. 3 is a section on the line III—III of Fig. 1.
Figure 4:
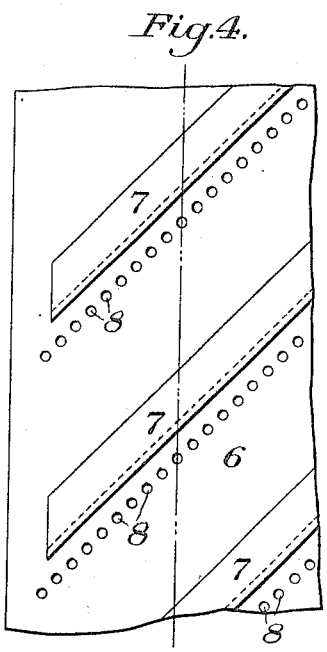
Figs. 4 and 5 are detail views hereinafter more particularly described.
Figure 5:
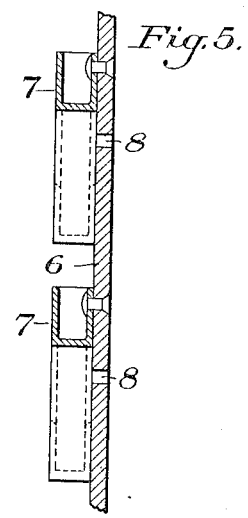

Placed within the tank in front of the inlet connection 4 is a vertical baffle or separator plate 6. This plate has its outer surface provided with a plurality of ribs which are inclined upwardly from each edge of the plate toward its center. Preferably these ribs will be made of separate members 7 of hollow trough form, as best shown in Fig. 5, and riveted or otherwise secured to the outer face of the baffle plate. Between adjacent ribs the plate is formed with lines of perforations or openings 8. The baffle plate 6 extends upwardly to the top of the tank, suitable guards 9 being provided to prevent the passage of the gas or other fluid around the edges thereof. The plate terminates at its lower end some distance above the bottom of the tank, and a guard or closing plate 10 is provided, so that none of the entering fluid can pass directly below and around said plate. I prefer to place immediately in front of the inlet opening a plurality of baffles 11 set at different angles, and which act to distribute the entering fluid throughout the height of the plate.

12 designates an endless chain placed vertically behind the baffle plate 6, this chain passing over a carrier wheel 13 at the upper portion of the tank, and also around a driving wheel 14 at the lower portion of the tank, means being provided, such as the gears 15, for driving the wheel 14 and keeping the chain in motion. 16 is an endless belt or mat of or comprising suitable fibrous material, which is hung over the chain 12, and which is considerably longer than the chain so as to provide a depending loop portion 17 at the bottom. This free loop portion is arranged to pass between rollers 18 which act as wringers. 19 is a vertical baffle plate placed between the chain 12 and the outlet 5. This baffle is preferably imperforate, but free passage is provided for the fluid above its top and bottom edges, and also around its sides.

The operation is as follows: The entering gas, or other fluid from which the vapor is to be removed, impinges against the front face of the plate 6, and a large percentage of its entrained moisture is at once precipitated on said plate, and is caught by the trough projections 7. The liquid caught in these troughs flows downwardly and laterally in opposite directions and is discharged at the open lower ends of the troughs into the lower portion of the tank, from which it may be drawn off from time to time; or the tank may be provided with any suitable drainage connection 20. After striking the plate and being acted upon thereby, the gas or other fluid is forced to pass through the perforations 8, and against the fibrous metallic or fibrous and metallic belt 16 which is adjacent to the escape ends of said perforations. This mat or belt acts as a filter and absorbing medium, and abstracts from the gas any such moisture as may remain therein, as well as any solid particles which may be entrained with the fluid. This mat or belt, by its contact with the endless chain, travels with the chain so that fresh surfaces thereof are being constantly brought into operative relation to the baffle plate. The saturated portions pass downwardly and through the wringing rolls 18 which squeeze out the moisture, thereby keeping the belt or mat in effective condition.

The advantages of my invention will be apparent, since it provides a very simple and effective separator, by which practically all the contained moisture in gas or other fluids may be separated out.

I desire it to be understood that this separator, either as shown or different arrangements of the various parts, may be used in either vertical, horizontal or inclined positions, without departing from the spirit and scope of my invention as defined in the appended claims.

I claim:

1. In a separator of the class described, a closed tank or container having inlet and outlet connections, a perforated baffle plate within the container opposite the inlet connection, a mat or belt comprising fibrous material placed behind and adjacent to the baffle plate, and means for moving said mat or belt to bring different portions thereof into operative relation to the baffle plate, substantially as described.

2. In a separator of the character described, a closed tank or container having inlet and outlet connections, a baffle plate placed opposite the inlet connection, said baffle plate having a plurality of inclined troughs on its forward side, and a plurality of perforations between said troughs, a traveling belt of absorbent character placed behind the said baffle, and an imperforate baffle plate behind said mat or belt, substantially as described.

3. A separator of the character described, comprising a closed tank or container having an inlet connection and an outlet connection, a vertical baffle plate having a plurality of perforations, means for distributing the entering fluid throughout substantially the full height of said plate, and an endless absorbing belt placed behind and adjacent to said baffle plate, together with means for keeping said mat or belt in motion, substantially as described.

4. A separator of the character described, comprising a closed container having inlet and outlet connections, a baffle plate placed opposite the inlet connection and having a plurality of perforations therethrough, an endless chain placed behind said baffle plate, means for carrying and driving said chain, and an endless belt comprising fibrous material placed over and carried by the said chain, substantially as described.

5. A separator of the character described, comprising a closed container having inlet and outlet connections, a baffle plate placed opposite the inlet connection and having a plurality of perforations therethrough, an endless chain placed behind said baffle plate, means for carrying and driving said chain, an endless belt comprising fibrous material placed over and carried by the said chain, said belt being longer than the chain and having a slack portion, and means for squeezing the moisture from said slack portion, substantially as described.

In testimony whereof, I have hereunto set my hand.

LOUIS C. FROHRIER

Witnesses:
  VAN A. REED, Jr.,
  C. HENRICH.

Copies of this patent may be obtained for five cents each, by addressing the "Commissioner of Patents. Washington, D. C."